United States Patent [19]
Baversten

[11] Patent Number: 5,400,374
[45] Date of Patent: Mar. 21, 1995

[54] SELF-EXPANDING WATERPROOF COVER FOR CRANE HOOK

[75] Inventor: Bengt I. Baversten, Weatogue, Conn.

[73] Assignee: Combustion Engineering, Inc., Windsor, Conn.

[21] Appl. No.: 175,221

[22] Filed: Dec. 29, 1993

[51] Int. Cl.⁶ .............................................. G21C 19/20
[52] U.S. Cl. .................... 376/260; 376/203; 294/131; 212/221
[58] Field of Search ............... 376/203, 260, 262, 264, 376/271, 287, 292; 212/220, 221, 266; 294/82.1, 131, 906; 220/216, 218, 221, 222; 414/146

[56] References Cited

U.S. PATENT DOCUMENTS

| 3,917,953 | 11/1975 | Wodrich | 376/272 |
| 5,133,466 | 7/1992 | Baversten | 212/221 |
| 5,170,899 | 12/1992 | Baversten | 376/260 |

*Primary Examiner*—Daniel D. Wasil
*Attorney, Agent, or Firm*—Ronald P. Kananen; John H. Mulholland

[57] ABSTRACT

A bellows-like construction which automatically extends upon immersion in water, is used to provide a relatively inexpensive water-tight enclosure for lifting equipment and the like. The lower end of the bellows is connected to the top of a rigid tubular member which extends up from a hook box or like type of structure, in a manner to form a hermetic seal. The upper end of the bellows-like arrangement is provided with a buoyant member which provides sufficient lift that, when the lifting equipment is lowered into the water to a predetermined depth, the buoyant member floats on the surface of the water in a manner which elongates a corrugated tubular portion of the arrangement and prevents radioactive water from spilling over into the box thus preventing contamination of a hook, hook block and associated apparatus which are enclosed therein.

6 Claims, 3 Drawing Sheets

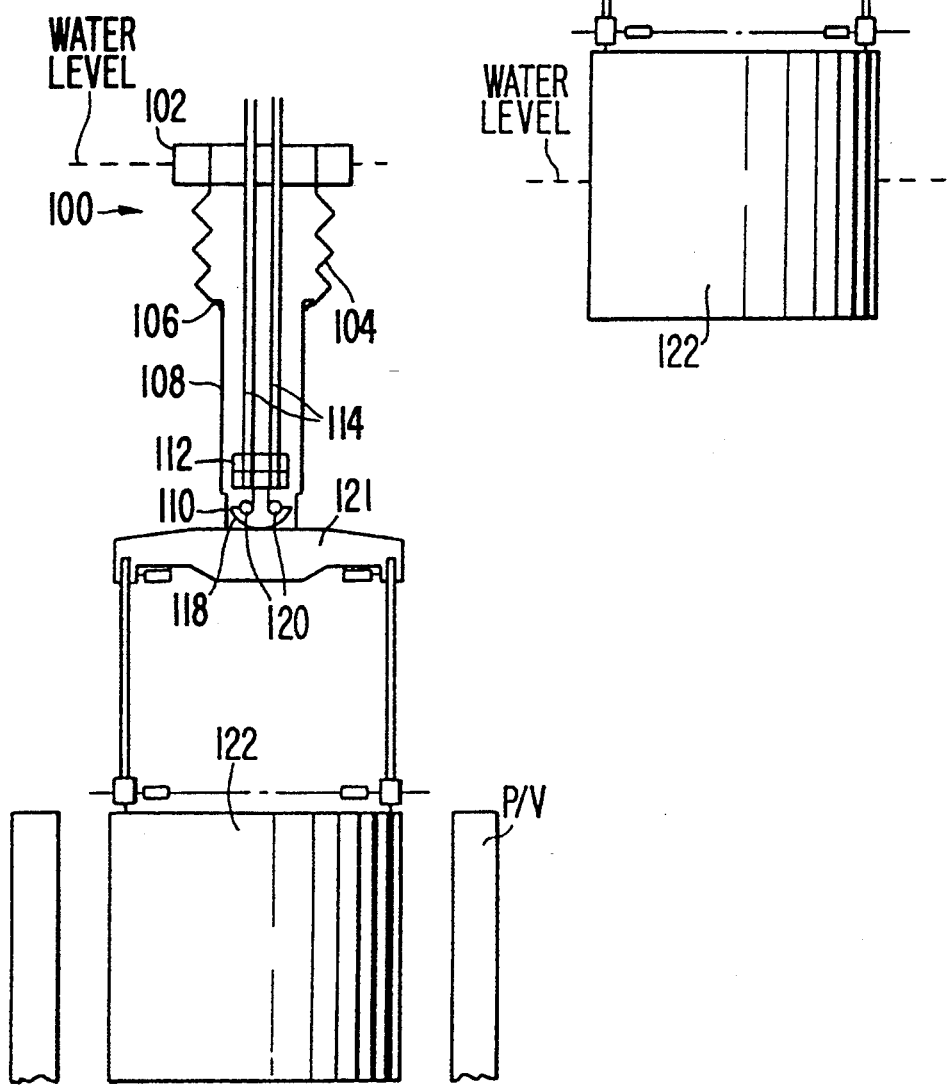

SELF-EXPANDING WATERPROOF COVER FOR CRANE HOOK

BACKGROUND OF THE INVENTION

1. Field of the Invention

The present invention relates generally to cranes for use in environments such as encountered in a boiling water nuclear reactor (BWR). More specifically, the present invention relates to a water proof cover arrangement for a heavy-duty overhead crane which prevents crane components from becoming radioactively contaminated when lowered into water which fills the reactor pressure vessel and surrounding reactor cavity.

2. Description of the Relevant Art

Movement of large pieces of equipment and components of a boiling water reactor is accomplished by flooding the reactor cavity and pressure vessel in a manner wherein radioactive emissions are suppressed and it is possible to remove the reactor head and perform routine maintenance, refuelling and the like. These procedures however, require that large pieces of equipment, such as steam seperators, be lifted out of the reactor pressure vessel and transferred to pools which are provided adjacent to the vessel and that form part of the reactor cavity. To achieve this transfer, it is necessary to use a heavy-duty overhead crane which comprises a part of the reactor system and which is mounted above the reactor cavity. Due to the limited space available within the reactor pressure vessel and the geometry of the pool of the reactor cavity within which the loads are temporarily stored, it is sometimes necessary to lower the crane hook below the surface of the water. Because the water is radioactive, it is undesirable for the crane hook, hook block or cables which supports the hook block, to come into direct contact with the water, as such contact causes contamination and demands that these pieces of apparatus be thoroughly washed or otherwise suitably decontaminated after each use.

U.S. Pat. No. 5,170,899 issued on Dec. 15, 1992 in the name of Baversten (the same inventive entity as named on this application), discloses an arrangement wherein a telescopic cover arrangement is provided on the hook box connected to the load to be lifted by the crane. The telescopic arrangement is arranged to be extendible when the hook is lowered below the surface of the water in a manner which encloses the hook, hook block and the lower portions of the suspending cables and provides an air space thereabout. However, in order for this telescopic arrangement to be effective, a watertight interface must be provided between the two moving elements. Further, in order achieve extension and contraction of the arrangement a remotely controlled servo which is either hydraulic or pneumatically operated, is required. This construction, however, requires both a precise seal and the provision of the remotely controlled hydraulic or pneumatic servo. The construction is thus relatively complex and expensive.

SUMMARY OF THE INVENTION

It is, therefore, a primary object of the present invention to provide a watertight cover for apparatus such as a crane hook, hook block and cables, which does not interfere with the crane operation and which is both relatively simple and inexpensive.

It is a further object of the present invention to provide a watertight cover arrangement which extends or deploys automatically in response to immersion in water and therefore obviates a need for a remotely controlled servo device for such purposes.

In brief, the above objects are achieved by an arrangement wherein a bellows-like construction which automatically extends upon immersion in water, is used as part of a water-tight enclosure for lifting equipment and the like. The lower end of the bellows is connected to the top of a tubular member which extends up from a hook box or like type of container-like structure, in a manner to form a hermetic seal. The upper end of the bellows-like arrangement is provided with a buoyant member which provides sufficient lift that, when the lifting equipment is lowered into the water to a predetermined depth, the buoyant member floats on the surface of the water in a manner which extends a corrugated tubular portion of the arrangement and prevents radioactive water from spilling over into the box thus preventing contamination of a hook, hook block and associated apparatus which are enclosed therein.

More specifically, a first aspect of the present invention resides in a cover for a hook box which encloses a hook and hook block, and which features: a rigid tubular member which is fixedly connected to the hook box in a manner which establishes a water-tight seal therebetween; an expandable bellows member having a lower end and an upper end, the lower end being connected to the rigid tubular member in a manner which defines a water-tight seal, the bellows member and the rigid tubular member defining an air space which extends upwardly from the hook box in a manner which encloses the hook box and cables which interconnect the hook block with an overhead crane; and a buoyant member which is disposed about the upper end of the bellows member and which is effective to expand the bellows in response to the hook box being lowered into water by a predetermined amount.

A second aspect of the invention resides in a nuclear reactor system which features: a reactor pressure vessel disposed in a reactor cavity, the reactor cavity including a separator pool which is separated from the reactor pressure vessel by a separator pool threshold; an overhead crane which is disposed above the reactor cavity and which is arranged to lift and transport a device that is normally disposed in the reactor pressure vessel, from the reactor pressure vessel to the separator pool while the reactor cavity is filled to a predetermined depth with water, the overhead crane including: a hook block which is suspended from the crane by cables; a hook operatively connected with the hook block and engageable with the device; a hook box which encloses the hook; a tubular extension which extends upwardly from the hook bock and which encloses the hook block and a portion of the cables; and a bellows arrangement provided at the upper end of the tubular extension, the bellows arrangement including: a flexible corrugated tube section, the flexible corrugated tube section having a lower end which is connected to the tubular extension in a manner which provides a watertight connection; and a buoyant member which is connected to an upper end of the corrugated tube section and effective to float on the surface of the water and cause the flexible corrugated tube to extend when the hook box is lowered to a predetermined depth below a surface of the water.

Another aspect of the invention resides in a method of preventing radioactive contamination of a hook, a hook block and associated cables, by: enclosing the hook and hook block in a hook box on which a tubular extension has been provided; providing a bellows arrangement at the top of the tubular extension; and using a buoyant member which forms part of the bellows arrangement and which floats on the surface of water used to suppress radioactive emissions, to elongate a flexible tubular portion which forms part of the bellows arrangement when the hook box submerges by a predetermined amount below the surface of the water.

A further aspect of the present invention resides in an apparatus for preventing contamination of a hook, a hook block and associated cables, which features: enclosure means which encloses the hook and the hook block, the enclosure means including a hook box and a tubular extension which is provided on the hook box and which extends up and around the hook block and cables which support the hook block; and bellows means at the top of the tubular extension, the bellows means including a buoyant member which is effective to float on water and provide sufficient lift to elongate a flexible corrugated tubular portion of the bellows arrangement when the hook box submerges by a predetermined amount below a surface of the water and thus prevent the hook, hook block and cables from coming into contact with the water.

Yet another aspect of the present invention resides in an enclosure for a device which features: a container-like structure which encloses the device; a flexible corrugated tube member which is sealingly connected to the container-like structure; and floatation means for causing the flexible corrugated tube member to extend upwardly when the container-like structure is immersed in water and prevent water from entering the container-like structure and coming into contact with the device.

BRIEF DESCRIPTION OF THE DRAWINGS

The present invention will become more clearly appreciated as a description of the preferred embodiment is made with reference to the appended drawings in which:

FIGS. 2, 3 and 4 are schematic views which show the invention applied to a hook box and which illustrate how the bellows expands in response to immersion in water during given operations involved in lifting a load out of the reactor pressure vessel and moving it into an adjacent holding pool.

DESCRIPTION OF THE PREFERRED EMBODIMENT

Figure 1:
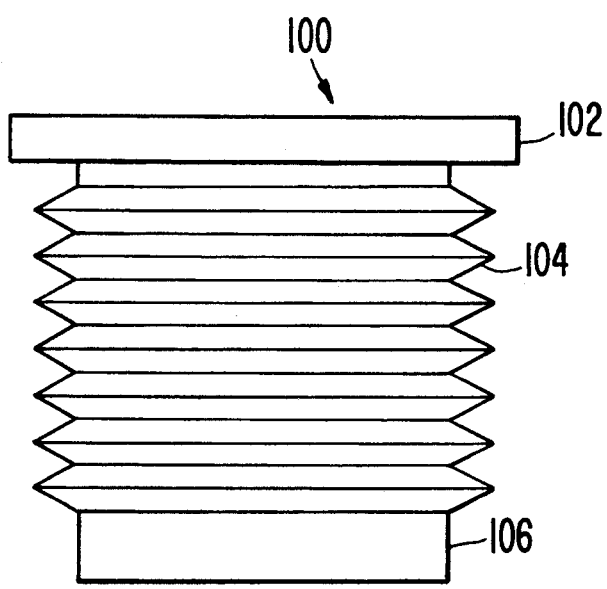
FIG. 1 is a front view of a bellows arrangement which characterizes an embodiment of the present invention.

FIG. 1 illustrates an example of the bellows type arrangement 100 which characterizes the present invention. As shown, this arrangement includes an annular buoyant member 102 formed at the upper end of an extendible flexible corrugated tube portion 104 which defines the main body of the bellows. A sleeve 106 is formed at the lower end of the corrugated tube 104. This sleeve 106 is arranged to enable the bellows arrangement 100 to be installed at the upper end of a rigid tubular extension 108 which is provided at the top of, or which forms part of, a conventional crane hook box 110, in a manner which forms a water-tight seal. The combination of the hook box, tubular extension and bellows arrangement provides a water-tight enclosure about a hook block 112 and cables 114 commonly associated with the type of overhead traveling crane 116 (schematically illustrated in FIG. 3) which is used in a boiling water reactor.

The hook box 110, which is of a size to receive hook 118, is detachably secured to the hook 118 by two parallel, transversely disposed pins 120. The hook box 110 is engageable with a load to be handled by the crane 116. For purposes of illustration, the hook box 110 is shown in association with a conventional strongback 121, which may be integrally formed with the hook box 110. The rigid tubular extension 108 is fixedly connected to the top of the hook box 110 in a manner which establishes a water-tight seal. The sleeve 106 of the bellows arrangement is of course connected to the tubular extension 108 in a manner which provides a water-tight seal.

Figure 4:
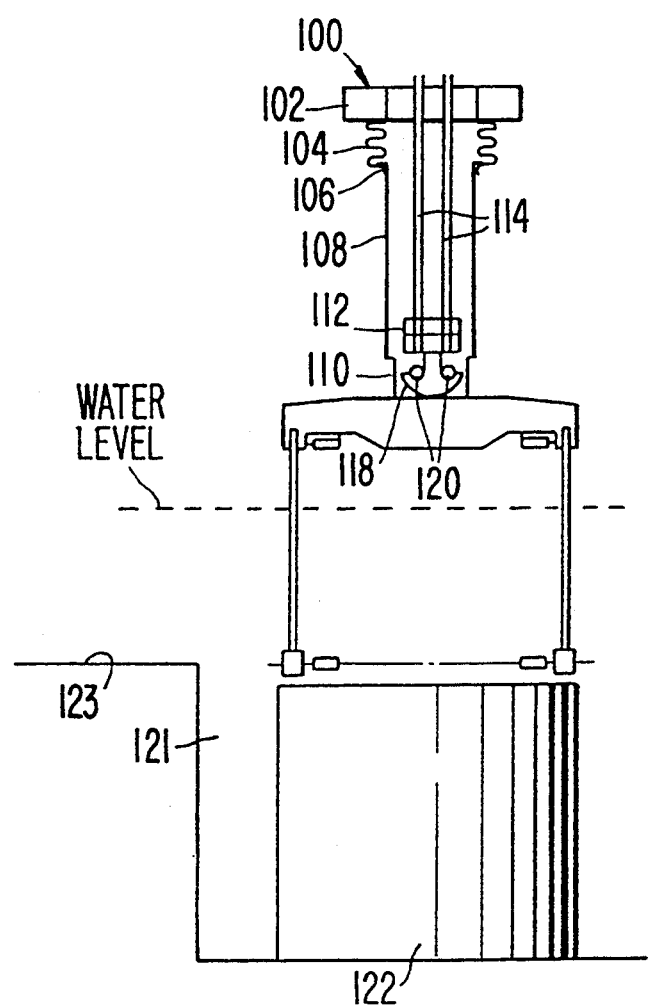

In FIGS. 2 to 4, the watertight enclosure 100 is shown in use within the reactor cavity of a boiling water reactor (BWR). In this instance the apparatus which is being removed from a pressure vessel P/V and moved to a separator pool 121 is, merely by way of example, a steam separator 122. As will be appreciated from these figures, it is necessary to lift the steam separator 122 up out of the pressure vessel P/V, carry it over the separator pool threshold 123 and then lower it into the separator pool 121 until it rests on the pool floor.

It will be appreciated that this problem is complicated by the comparatively low maximum travel height of the overhead crane 116 and the desire to avoid wetting the crane hook 118, hook block 112 and cables 114 with contaminating radioactive water.

With the provision of the tubular extension 108 and the bellows arrangement 100 in accordance with the present invention, as the hook 118 and hook block 112 are lowered down into the reactor cavity and reach a given depth below the water level, the buoyant member floats 102 on the surface of the water and produces sufficiently lift to induce the corrugated tube portion 104 of the bellows arrangement 100 to extend as the hook 118 and hook box 112 continue to sink below the surface of the water, and assume the condition illustrated in FIG. 2. As will be appreciated, with the bellows arrangement 100 extended in this manner, the radioactive water is prevented from contacting the hook 118, hook block 112 and portion of the cables 114 which are below water level, hence preventing contamination of these components.

After the appropriate connection is established and the steam separator 122 is lifted out of the pressure vessel P/V and raised to a level wherein it can be carried over a separator pool threshold 123 (such as illustrated in FIG. 3), the corrugated tube portion 104 is compressed under the weight of the buoyant member 104 and assumes a non-extended condition such as illustrated in FIGS. 3 and 4.

When the steam separator 122 is lowered into the separator pool 121 and comes to rest on the floor of the pool (see FIG. 4), the hook box 110 is still above the level of the water in the reactor cavity and the bellows arrangement 100 remains in its non-extended state.

When it is time to return the steam separator 122 to the pressure vessel P/V, the device lifted up out of the separator pool 121, moved over the separator pool threshold 123 and lowered back down into its operative position in the reactor pressure vessel P/V. Again as the hook 118 and hook box 110 are lowered sufficiently below the level of the water, the bellows 100 arrangement elongates due to the floatation of the buoyant member on the water and any contaminating contact between the water and the hook 118 and associated pieces of apparatus is prevented.

The present invention is particularly useful in situations wherein the bellows arrangement 100 is required to undergo a relative short amount extension. The bellows is preferably made of plastic or rubber and provided with reinforcing rings or a springy helical coil so as increase the resistance the force produced by the water pressure acting on the external surface of the corrugated tube portion 104.

The bellows arrangement which characterizes the present invention is relatively simple, cheap, readily replaceable and expands and contracts automatically in response to immersion. Accordingly, the need for a remote controlled servo device is eliminated and the crane operations are simplified in that the expansion and contraction of the bellows is totally automatic and does not require any operator intervention.

Although the invention has been described by reference to only a single embodiment, it is to be understood that various changes and modifications may be effected without departing from the scope of the invention which is intended to be limited only the appended claims.

What is claimed is:

1. A cover for a hook box which encloses a hook and hook block, comprising:
   a rigid tubular member which is fixedly connected to said hook box in a manner which establishes a water-tight seal therebetween;
   an expandable bellows member having a lower end and an upper end, the lower end being connected to said rigid tubular member in a manner which defines a water-tight seal, said bellows member and said rigid tubular member defining an air space which extends upwardly from said hook box in a manner which encloses cables which interconnect said hook block with an overhead crane; and
   a buoyant member which is disposed about the upper end of said bellows member and which is effective to expand said bellows in response to said hook box being lowered into water by a predetermined amount.

2. A cover as set forth in claim 1, further comprising reinforcement means for reinforcing said extendible bellows member against the pressure applied by water against an external surface thereof.

3. A nuclear reactor system comprising:
   a reactor pressure vessel disposed in a reactor cavity, said reactor cavity including a separator pool which is separated from said reactor pressure vessel by a separator pool threshold;
   an overhead crane disposed above said reactor cavity and arranged to lift and transport a device which is normally disposed in said reactor pressure vessel, from said reactor pressure vessel to said separator pool while said reactor cavity is filled to a predetermined depth with water, said overhead crane including:
   a hook block which is suspended from said crane by cables;
   a hook operatively connected with said hook block and engageable with said device;
   a hook box which encloses said hook;
   a tubular extension which extends upwardly from said hook bock and which encloses said hook block and a portion of said cables; and
   a bellows arrangement provided at the upper end of said tubular extension, said bellows arrangement including:
   a flexible corrugated tube section, said flexible corrugated tube section having a lower end which is connected to said tubular extension in a manner which provides a watertight connection; and
   a buoyant member which is connected to an upper end of said corrugated tube section and effective to float on the surface of the water and cause said flexible corrugated tube to extend when said hook box is lowered to a predetermined depth below a surface of the water.

4. A method of preventing radioactive contamination of a hook, a hook block and associated cables, by:
   enclosing the hook and hook block in a hook box on which a tubular extension has been provided;
   providing a bellows arrangement at the top of the tubular extension; and
   using a buoyant member which forms part of the bellows arrangement and which floats on the surface of water used to suppress radioactive emissions, to elongate a flexible tubular portion which forms part of the bellows arrangement when the hook box submerges by a predetermined amount below the surface of the water.

5. Apparatus for preventing contamination of a hook, a hook block and associated cables, comprising:
   enclosure means which encloses the hook and hook block, said enclosure means including a hook box and a tubular extension which is provided on the hook box and which extends up and around the hook block and cables which support the hook block; and
   bellows means at the top of the tubular extension, said bellows means including a buoyant member which is effective to float on water and provide lift to elongate a flexible corrugated tubular portion of the bellows arrangement when the hook box submerges by a predetermined amount below a surface of the water and thus prevent the hook, hook block and cables from coming into contact with the water.

6. An enclosure for a device comprising:
   a container-like structure which encloses said device;
   a flexible corrugated tube member which is sealingly connected to said container-like structure; and
   floatation means for causing said flexible corrugated tube member to extend upwardly when said container-like structure is immersed in water and prevent water from entering said container-like structure and coming into contact with said device.

* * * * *